United States Patent
Yim et al.

(10) Patent No.: US 11,721,256 B2
(45) Date of Patent: Aug. 8, 2023

(54) FLEXIBLE DISPLAY DEVICE AND METHOD OF DRIVING THE FLEXIBLE DISPLAY DEVICE

(71) Applicant: Samsung Display Co., LTD., Yongin-si (KR)

(72) Inventors: Dale Yim, Yongin-si (KR); Wonbok Lee, Seongnam-si (KR)

(73) Assignee: Samsung Display Co., LTD., Yongin-si (KR)

( * ) Notice: Subject to any disclaimer, the term of this patent is extended or adjusted under 35 U.S.C. 154(b) by 0 days.

(21) Appl. No.: 17/684,347

(22) Filed: Mar. 1, 2022

(65) Prior Publication Data
US 2022/0351657 A1   Nov. 3, 2022

(30) Foreign Application Priority Data
Apr. 28, 2021   (KR) ........................ 10-2021-0055103

(51) Int. Cl.
*G09G 3/00* (2006.01)
*G06T 7/90* (2017.01)

(52) U.S. Cl.
CPC .............. *G09G 3/035* (2020.08); *G06T 7/90* (2017.01); *G06T 2207/10024* (2013.01); *G09G 2310/0275* (2013.01); *G09G 2320/0233* (2013.01); *G09G 2320/0242* (2013.01); *G09G 2320/0686* (2013.01); *G09G 2340/06* (2013.01); *G09G 2360/16* (2013.01)

(58) Field of Classification Search
CPC ....... G09G 2340/06; G09G 2320/0233; G09G 5/02; G09G 2320/0242; G09G 2320/0626; G09G 3/002; G09G 5/06; G09G 2380/02; G09G 3/035; G09G 3/2003; G09G 2360/16; G09G 2320/0693; G09G 2320/0686; G06F 1/1652; G06F 2203/04102; G06F 1/1641; G06F 2203/04803; G06F 1/1616
See application file for complete search history.

(56) References Cited

U.S. PATENT DOCUMENTS

| | | | |
|---|---|---|---|
| 9,001,010 B2 | 4/2015 | Jeon | |
| 10,755,670 B2 | 8/2020 | Seo et al. | |
| 11,049,427 B2 | 6/2021 | Kim et al. | |
| 2010/0271549 A1* | 10/2010 | Kuwabara | G03B 21/006 348/E5.1 |
| 2012/0250241 A1 | 10/2012 | Minemura et al. | |

(Continued)

FOREIGN PATENT DOCUMENTS

| | | |
|---|---|---|
| JP | 5197813 | 5/2013 |
| KR | 10-2019-0073633 | 6/2019 |

(Continued)

*Primary Examiner* — Sanjiv D. Patel
(74) *Attorney, Agent, or Firm* — H.C. Park & Associates, PLC

(57) ABSTRACT

A flexible display device includes a flexible display panel having a first display area that is adjacent to a first end of the flexible display panel and a second display area that is adjacent to a second end of the flexible display panel, a data driver configured to output a data voltage to the flexible display panel, and a driving controller configured to control the data driver. Here, a second image displayed in the second display area compensates for a first image displayed in the first display area.

19 Claims, 11 Drawing Sheets

(56) References Cited

U.S. PATENT DOCUMENTS

| | | | | |
|---|---|---|---|---|
| 2014/0063041 A1* | 3/2014 | Jang | ................ | G09G 5/02 345/591 |
| 2020/0243007 A1* | 7/2020 | Jeon | ................ | G09G 3/3233 |
| 2020/0372845 A1* | 11/2020 | Kim | ................ | G09G 3/008 |

FOREIGN PATENT DOCUMENTS

| KR | 10-2009724 | 8/2019 |
|---|---|---|
| KR | 10-2020-0135599 | 12/2020 |

\* cited by examiner

FIG. 7

$q = \text{rounddown}(Y\_IN/32)$, $\quad r = \text{mod}(Y\_IN, 32)$     MATHEMATICAL FORMULA 1, MATHEMATICAL FORMULA 2

IF $(q < \text{cref})$    MATHEMATICAL FORMULA 3, MATHEMATICAL FORMULA 4
$cf1 = \text{LUT}(q)*32$, $cf2 = \text{LUT}(q+1)*32$
IF $(q >= \text{cref})$
$cf1 = \text{LUT}(q)*32$, $cf2 = \text{LUT}(q)*32$    MATHEMATICAL FORMULA 5, MATHEMATICAL FORMULA 6

IF $(cf1 <= cf2)$
$cf = \text{rounddown}((cf2-cf1)*r/32) + cf1$    MATHEMATICAL FORMULA 7
IF $(cf1 > cf2)$
$cf = cf1 - \text{rounddown}((cf1-cf2)*r/32)$    MATHEMATICAL FORMULA 8

$Y\_OUT = Y\_IN + cf*LW$    MATHEMATICAL FORMULA 9

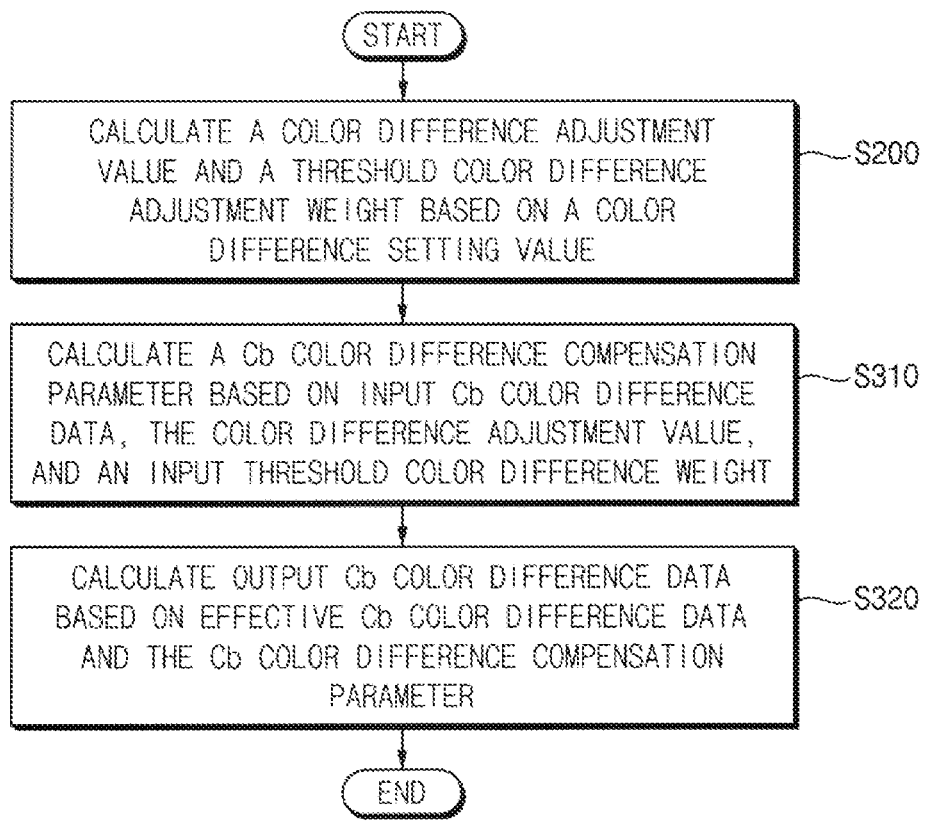

FIG. 9

```
IF (reg_color_weight <= w1)
Interpolation_point =
(reg_color_ctrl1-reg_color_ctrl0)*reg_color_weight/64 +
reg_color_ctrl0
color_weight_th_i = reg_color_weight_th_i1
```
MATHEMATICAL FORMULA 10

MATHEMATICAL FORMULA 11

```
IF (w1 < reg_color_weight <= w2)
Interpolation_point =
(reg_color_ctrl2-reg_color_ctrl1)*(reg_color_weight-w1)/64 +
reg_color_ctrl1
color_weight_th_i = reg_color_weight_th_i2
```
MATHEMATICAL FORMULA 12

MATHEMATICAL FORMULA 13

```
IF (w2 < reg_color_weight <= w3)
Interpolation_point =
(reg_color_ctrl3-reg_color_ctrl2)*(reg_color_weight-w2)/64 +
reg_color_ctrl2
color_weight_th_i = reg_color_weight_th_i3
```
MATHEMATICAL FORMULA 14

MATHEMATICAL FORMULA 15

```
IF (w3 < reg_color_weight <= w4)
Interpolation_point =
(reg_color_ctrl4-reg_color_ctrl3)*(reg_color_weight-w3)/64 +
reg_color_ctrl3
color_weight_th_i = reg_color_weight_th_i4
```
MATHEMATICAL FORMULA 16

MATHEMATICAL FORMULA 17

FIG. 10

$Cb\_V = Cb\_IN - MP$  ← MATHEMATICAL FORMULA 18

IF (abs(Cb_V) > color_weight_th)
cb_interpolation_point = 2^28 + interpolation_point*2^20 - interpolation_point*(abs(Cb_V)-color_weight_th)*color_weight_th  ← MATHEMATICAL FORMULA 19

IF (abs(Cb_V) <= color_weight_th)
cb_interpolation_point = 2^28 + interpolation_point*2^20  ← MATHEMATICAL FORMULA 20

FIG. 11

$Cb\_MIDDLE = Cb\_V * (cb\_interpolation\_point) / 2^{28}$  ← MATHEMATICAL FORMULA 21

$Cb\_OUT = Cb\_MIDDLE + MP$  ← MATHEMATICAL FORMULA 22

FIG. 13

$Cr\_V = Cr\_IN - MP$ — MATHEMATICAL FORMULA 23

IF (abs(Cr_V) > color_weight_th)
cr_interpolation_point = 2^28 + interpolation_point*2^20 - interpolation_point*(abs(Cr_V)-color_weight_th)*color_weight_th_i — MATHEMATICAL FORMULA 24

IF (abs(Cr_V) <= color_weight_th)
cr_interpolation_point = 2^28 + interpolation_point*2^20 — MATHEMATICAL FORMULA 25

FIG. 14

$Cr\_MIDDLE = Cr\_V * (cr\_interpolation\_point) / 2^{28}$ — MATHEMATICAL FORMULA 26

$Cr\_OUT = Cr\_MIDDLE + MP$ — MATHEMATICAL FORMULA 27

FLEXIBLE DISPLAY DEVICE AND METHOD OF DRIVING THE FLEXIBLE DISPLAY DEVICE

CROSS-REFERENCE TO RELATED APPLICATION

This application claims priority from and the benefit of Korean Patent Application No. 10-2021-0055103, filed on Apr. 28, 2021, which is hereby incorporated by reference for all purposes as if fully set forth herein.

BACKGROUND

Field

Embodiments of the invention relate generally to a flexible display device and a method of driving the flexible display device and more particularly, to a flexible display device including a flexible display panel configured to display images that are symmetrical to each other with respect to a folding line in a first display area and a second display area in a specific mode and a method of driving the flexible display device.

Discussion of the Background

In general, a display device may include a display panel and a display panel driver. The display panel may include a plurality of gate lines, a plurality of data lines, and a plurality of pixels. The display panel driver may include a gate driver configured to provide gate signals to the gate lines, a data driver configured to provide data voltages to the data lines, and a driving controller configured to control the gate driver and the data driver.

A flexible display device (e.g., a foldable display device) in which a bending characteristic of a flexible display panel is maximized to allow the flexible display device to be folded has been developed. The flexible display device may have at least two display areas, and the display areas may be formed in one flexible display panel.

The above information disclosed in this Background section is only for understanding of the background of the inventive concepts, and, therefore, it may contain information that does not constitute prior art.

SUMMARY

Flexible display devices constructed according to the principles of the invention are capable of providing a second image displayed in a second display area to compensate for a first image displayed in a first display area by displaying images that are symmetrical to each other in the first display area and the second display area in a specific mode, respectively.

Methods of driving the flexible display device according to the principles of the invention are capable of providing a second image displayed in a second display area to compensate for a first image displayed in a first display area by displaying images that are symmetrical to each other in the first display area and the second display area in a specific mode, respectively.

Additional features of the inventive concepts will be set forth in the description which follows, and in part will be apparent from the description, or may be learned by practice of the inventive concepts.

According to an aspect of the invention, a flexible display device includes a flexible display panel having a first display area that is adjacent to a first end of the flexible display panel and a second display area that is adjacent to a second end of the flexible display panel, a data driver configured to output a data voltage to the flexible display panel, and a driving controller configured to control the data driver. Here, a second image displayed in the second display area compensates for a first image displayed in the first display area.

The first image displayed in the first display area may compensate for the second image displayed in the second display area.

In a first mode, the first image displayed in the first display area and the second image displayed in the second display area form one continuous image. In addition, in a second mode, the first image displayed in the first display area and the second image displayed in the second display area may be substantially symmetrical to each other with respect to a folding line. Further, in the second mode, the second image displayed in the second display area may be a compensation image that compensates for a luminance and a color difference of the first image displayed in the first display area.

The second image displayed in the second display area may be the compensation image having one-to-one correspondence with the first image displayed in the first display area in a unit of a pixel.

The flexible display panel may be configured to display the compensation image in the second display area when a folding angle between the first display area and the second display area is less than 90 degrees.

The driving controller may include a YCbCr converter configured to convert input RGB data included in input image data into input YCbCr data, an image processor configured to receive the input YCbCr data and to compensate for a luminance and a color difference of the input YCbCr data to generate output YCbCr data for displaying the second image in the second display area that compensates for the first image, and an RGB converter configured to convert the output YCbCr data into a data signal including output RGB data.

The image processor may be configured to calculate a first effective constant and a second effective constant based on input luminance data included in the input YCbCr data, to calculate a first luminance parameter and a second luminance parameter by using a look-up table for defining a relation between the first effective constant and the first luminance parameter and a relation between the first effective constant and the second luminance parameter, to calculate a luminance compensation parameter based on the first luminance parameter and the second luminance parameter, and to calculate output luminance data based on the luminance compensation parameter and a luminance weight.

The image processor may be configured to calculate the first effective constant by using a mathematical formula "q=rounddown(Y_IN/32)", wherein q is the first effective constant, Y_IN is the input luminance data, and rounddown(Y_IN/32) is an integer part of a value obtained by dividing the input luminance data by 32, and to calculate the second effective constant by using a mathematical formula "r=mod(Y_IN,32)", wherein r is the second effective constant, and mod(Y_IN,32) is a remainder of a value obtained by dividing the input luminance data by 32.

The image processor may be configured to calculate the first luminance parameter by using a mathematical formula "cf1=LUT(q)*32" and calculate the second luminance parameter by using a mathematical formula "cf2=LUT(q+1)*32" when the first effective constant is less than a reference effective constant, wherein cf1 is the first luminance parameter, cf2 is the second luminance parameter, LUT(q) is a corresponding value corresponding to the first effective constant defined in the look-up table, and LUT(q+1) is a corresponding value corresponding to q+1 defined in the look-up table, and to calculate the first luminance parameter by using a mathematical formula "cf1=LUT(q)*32" and calculate the second luminance parameter by using a mathematical formula "cf2=LUT(q)*32" when the first effective constant is greater than or equal to the reference effective constant, wherein cf1 is the first luminance parameter, cf2 is the second luminance parameter, and LUT(q) is a corresponding value corresponding to the first effective constant defined in the look-up table.

The image processor may be configured to calculate the luminance compensation parameter by using a mathematical formula "cf=rounddown((cf2−cf1)*r/32)+cf1" when the first luminance parameter is less than or equal to the second luminance parameter, wherein cf is the luminance compensation parameter, cf1 is the first luminance parameter, cf2 is the second luminance parameter, r is the second effective constant, and rounddown((cf2−cf1)*r/32) is an integer part of (cf2−cf1)*r/32, and to calculate the luminance compensation parameter by using a mathematical formula "cf=cf1−rounddown((cf1−cf2)*r/32)" when the first luminance parameter is greater than the second luminance parameter, wherein cf is the luminance compensation parameter, cf1 is the first luminance parameter, cf2 is the second luminance parameter, r is the second effective constant, and rounddown((cf1-cf2)*r/32) is an integer part of (cf1-cf2)*r/32.

The image processor may be configured to calculate the output luminance data by using a mathematical formula "Y_OUT=Y_IN+cf*LW", wherein Y_OUT is the output luminance data, Y_IN is the input luminance data, cf is the luminance compensation parameter, and LW is the luminance weight.

The image processor may be configured to receive a color difference setting value and to calculate a color difference adjustment value and a threshold color difference adjustment weight based on the color difference setting value. In addition, the color difference setting value may include at least one of color difference control values, an input color difference weight, reference color difference weights, and input threshold color difference adjustment weights. Further, the image processor is configured to calculate the color difference adjustment value by using a mathematical formula "Interpolation_point=(reg_color_ctrl1−reg_color_ctrl0)*reg_color_weight/64+reg_color_ctrl0" and calculate the threshold color difference adjustment weight by using a mathematical formula "color_weight_th_i=reg_color_weight_th_i1" when the input color difference weight is less than or equal to a first reference color difference weight, wherein Interpolation_point is the color difference adjustment value, reg_color_ctrl0 is an initial color difference control value, reg_color_ctrl1 is a first color difference control value, reg_color_weight is an input color difference weight, color_weight_th_i is the threshold color difference adjustment weight, and reg_color_weight_th_i1 is a first input threshold color difference adjustment weight, to calculate the color difference adjustment value by using a mathematical formula "Interpolation_point=(reg_color_ctrl2-reg_color_ctrl1)*(reg_color_weight-w1)/64+reg_color_ctrl1" and calculate the threshold color difference adjustment weight by using a mathematical formula "color_weight_th_i=reg_color_weight_th_i2" when the input color difference weight is greater than the first reference color difference weight and less than or equal to a second reference color difference weight, wherein Interpolation_point is the color difference adjustment value, reg_color_ctrl1 is the first color difference control value, reg_color_ctrl2 is a second color difference control value, reg_color_weight is the input color difference weight, color_weight_th_i is the threshold color difference adjustment weight, and reg_color_weight_th_i2 is a second input threshold color difference adjustment weight, to calculate the color difference adjustment value by using a mathematical formula "Interpolation_point=(reg_color_ctrl3-reg_color_ctrl2)*(reg_color_weight-w2)/64+reg_color_ctrl2" and calculate the threshold color difference adjustment weight by using a mathematical formula "color_weight_th_i=reg_color_weight_th_i3" when the input color difference weight is greater than the second reference color difference weight and less than or equal to a third reference color difference weight, wherein Interpolation_point is the color difference adjustment value, reg_color_ctrl2 is the second color difference control value, reg_color_ctrl3 is a third color difference control value, reg_color_weight is the input color difference weight, color_weight_th_i is the threshold color difference adjustment weight, and reg_color_weight_th_i3 is a third input threshold color difference adjustment weight, and to calculate the color difference adjustment value by using a mathematical formula "Interpolation_point=(reg_color_ctrl4−reg_color_ctrl3)*(reg_color_weight−w3)/64+reg_color_ctrl3" and calculate the threshold color difference adjustment weight by using a mathematical formula "color_weight_th_i=reg_color_weight_th_i4" when the input color difference weight is greater than the third reference color difference weight and less than or equal to a fourth reference color difference weight, wherein Interpolation_point is the color difference adjustment value, reg_color_ctrl3 is the third color difference control value, reg_color_ctrl4 is a fourth color difference control value, reg_color_weight is the input color difference weight, color_weight_th_i is the threshold color difference adjustment weight, and reg_color_weight_th_i4 is a fourth input threshold color difference adjustment weight.

The image processor may be configured to receive a color difference setting value and calculate a color difference adjustment value and a threshold color difference adjustment weight based on the color difference setting value, to calculate a Cb color difference compensation parameter based on input Cb color difference data included in the input YCbCr data, the color difference adjustment value, and an input threshold color difference weight included in the color difference setting value, to calculate effective Cb color difference data by using a mathematical formula "Cb_V=Cb_IN−MP", wherein Cb_V is the effective Cb color difference data, Cb_IN is the input Cb color difference data, and MP is color difference middle data, to perform bit-conversion on the input threshold color difference weight to calculate a threshold color difference weight, and to calculate output Cb color difference data based on the effective Cb color difference data and the Cb color difference compensation parameter.

The image processor may be configured to calculate the Cb color difference compensation parameter by using a mathematical formula "cb_interpolation_point=2∞+interpolation_point*2^20−interpolation_point*(abs(Cb_V)−color_weight_th)*color_weight_th_i" when an absolute value of the effective Cb color difference data is greater than the threshold color difference weight, wherein cb_interpolation_point is the Cb color difference compensation parameter, interpolation_point is the color difference adjustment value, abs(Cb_V) is the absolute value of the effective Cb color difference data, color_weight_th is the threshold color difference weight, and color_weight_th_i is the threshold color difference adjustment weight, and to calculate the Cb color difference compensation parameter by using a mathematical formula "cb_interpolation_point=2^28+interpolation_point*2^20" when the absolute value of the effective Cb color difference data is less than or equal to the threshold color difference weight, wherein cb_interpolation_point is the Cb color difference compensation parameter, and interpolation_point is the color difference adjustment value.

The image processor may be configured to calculate middle Cb color difference data by using a mathematical formula "Cb_MIDDLE=Cb_V*(cb_interpolation_point)/2^28", wherein Cb_MIDDLE is the middle Cb color difference data, Cb_V is the effective Cb color difference data, and cb_interpolation_point is the Cb color difference compensation parameter, and to calculate the output Cb color difference data by using a mathematical formula "Cb_OUT=Cb_MIDDLE+MP", wherein Cb_OUT is the output Cb color difference data, Cb_MIDDLE is the middle Cb color difference data, and MP is the color difference middle data.

The image processor may be configured to calculate a Cr color difference compensation parameter based on input Cr color difference data included in the input YCbCr data, a color difference adjustment value calculated based on a color difference setting value, and an input threshold color difference weight included in the color difference setting value, to calculate effective Cr color difference data by using a mathematical formula "Cr_V=Cr_IN−MP", wherein Cr_V is the effective Cr color difference data, Cr_IN is the input Cr color difference data, and MP is color difference middle data, to perform bit-conversion on the input threshold color difference weight to calculate a threshold color difference weight, and to calculate output Cr color difference data based on the effective Cr color difference data and the Cr color difference compensation parameter.

The image processor may be configured to calculate the Cr color difference compensation parameter by using a mathematical formula "cr_interpolation_point=2∞+interpolation_point*2^20−interpolation_point*(abs(Cr_V)−color_weight_th)*color_weight_th_i" when an absolute value of the effective Cr color difference data is greater than the threshold color difference weight, wherein cr_interpolation_point is the Cr color difference compensation parameter, interpolation_point is the color difference adjustment value, abs(Cr_V) is the absolute value of the effective Cr color difference data, color_weight_th is the threshold color difference weight, and color_weight_th_i is the threshold color difference adjustment weight, and to calculate the Cr color difference compensation parameter by using a mathematical formula "cr_interpolation_point=2^28+interpolation_point*2^20" when the absolute value of the effective Cr color difference data is less than or equal to the threshold color difference weight, wherein cr_interpolation_point is the Cr color difference compensation parameter, and interpolation_point is the color difference adjustment value.

The image processor may be configured to calculate middle Cr color difference data by using a mathematical formula "Cr_MIDDLE=Cr_V*(cr_interpolation_point)/2^28", wherein Cr_MIDDLE is the middle Cr color difference data, Cr_V is the effective Cr color difference data, and cr_interpolation_point is the Cr color difference compensation parameter, and to calculate the output Cr color difference data by using a mathematical formula "Cr_OUT=Cr_MIDDLE+MP", wherein Cr_OUT is the output Cr color difference data, Cr_MIDDLE is the middle Cr color difference data, and MP is the color difference middle data.

According to another aspect of the invention, a method of driving a flexible display device includes the steps of: displaying a first image in a first display area that is adjacent to a first end of a flexible display panel, and displaying a second image in a second display area that is adjacent to a second end of the flexible display panel. Here, in a first mode, the first image displayed in the first display area and the second image displayed in the second display area form one continuous image. In addition, in a second mode, the first image displayed in the first display area and the second image displayed in the second display area are substantially symmetrical to each other with respect to a folding line of the flexible display panel. Further, in the second mode, the second image displayed in the second display area compensates for a luminance and a color difference of the first image displayed in the first display area.

The method of driving the flexible display device may further include the steps of: converting input RGB data included in input image data into input YCbCr data, compensating for a luminance and a color difference of the input YCbCr data to generate output YCbCr data for displaying the second image in the second display area that compensates for the luminance and the color difference of the first image, and converting the output YCbCr data into a data signal including output RGB data.

Therefore, a flexible display device and a method of driving the flexible display device according to the principles of the invention may display one image in a first display area and a second display area as a whole in a first mode and may display images that are symmetrical to each other with respect to a folding line in the first display area and the second display area in a second mode, respectively. In the second mode, a second image displayed in the second display area may compensate for a luminance and a color difference of a first image displayed in the first display area. Thus, visibility of the first image displayed in the first display area can be improved in an outdoor environment where external light is strong. As a result, according to the flexible display device and the method of driving the flexible display device, display quality can be improved.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

FIG. 7 is a list of mathematical formulas used when an image processor included in the driving controller of FIG. 5 calculates output luminance data.

FIG. 8 is a flowchart illustrating an operation in which an image processor included in the driving controller of FIG. 5 calculates output Cb color difference data.

FIG. 9 is a list of mathematical formulas used when an image processor included in the driving controller of FIG. 5 calculates a color difference adjustment value and a threshold color difference adjustment weight.

FIG. 10 is a list of mathematical formulas used when an image processor included in the driving controller of FIG. 5 calculates a Cb color difference compensation parameter.

FIG. 11 is a list of mathematical formulas used when an image processor included in the driving controller of FIG. 5 calculates output Cb color difference data.

FIG. 13 is a list of mathematical formulas used when an image processor included in the driving controller of FIG. 5 calculates a Cr color difference compensation parameter.

FIG. 14 is a list of mathematical formulas used when an image processor included in the driving controller of FIG. 5 calculates output Cr color difference data.

DETAILED DESCRIPTION OF TIE EMBODIMENTS

Figure 1:
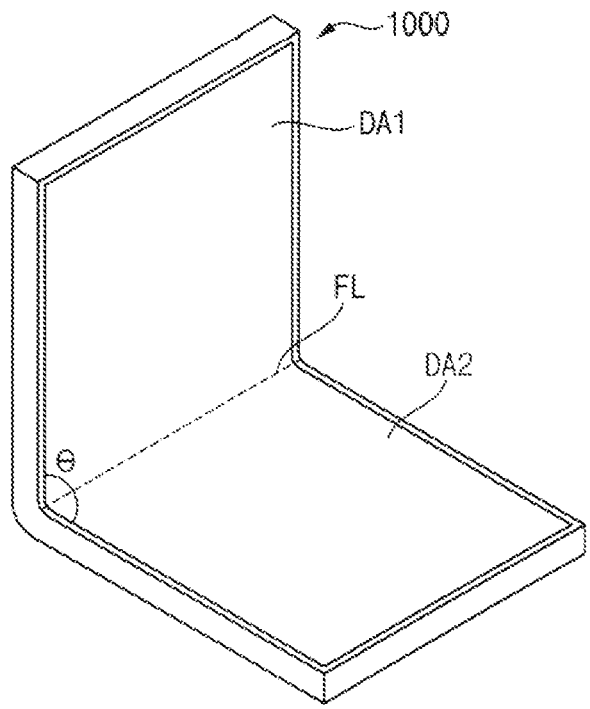
FIG. 1 is a perspective view of an embodiment of a flexible display device constructed according to the principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments of the invention will be explained in detail with reference to the accompanying drawings.

Figure 2:
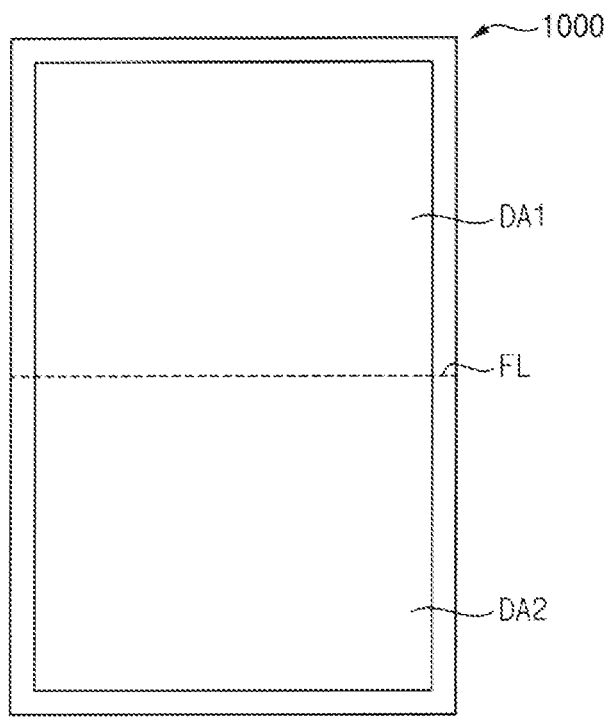
FIG. 2 is a plan view of the flexible display device of FIG. 1.

FIG. 1 is a perspective view of an embodiment of a flexible display device 1000 constructed according to the principles of the invention, and FIG. 2 is a plan view of the flexible display device 1000 of FIG. 1.

Referring to FIGS. 1 and 2, The flexible display device 1000 may be bendable. The flexible display device 1000 may be foldable. The flexible display device 1000 may be folded along a folding line FL. The flexible display device 1000 may include a flexible display panel 100 (in FIG. 3).

The flexible display panel 100 may include a first display area DA1 disposed on a first side of the folding line FL, and a second display area DA2 disposed on a second side of the folding line FL.

In a first mode, one continuous image may be displayed in the first display area DA1 and the second display area DA2 of the flexible display panel 100. Here, an image displayed in the first display area DA1 may be different from an image displayed in the second display area DA2. The first mode may be a normal mode. The first mode may be an unfolding mode in which the flexible display panel 100 is unfolded.

In a second mode, images that are symmetrical to each other with respect to the folding line FL may be displayed in the first display area DA1 and the second display area DA2 of the flexible display panel 100, respectively. Here, when viewed in a plan view as shown in FIG. 2, the image displayed in the first display area DA1 may be an image obtained by vertically inverting the image displayed in the second display area DA2. The second mode may be a mirror reverse view mode. The second mode may be a folding mode in which the flexible display panel 100 is folded.

The first and second modes may be determined according to a folded state of the flexible display panel 100, or the first and second modes may be determined according to a setting of a user, regardless of the folded state of the flexible display panel 100.

Figure 3:
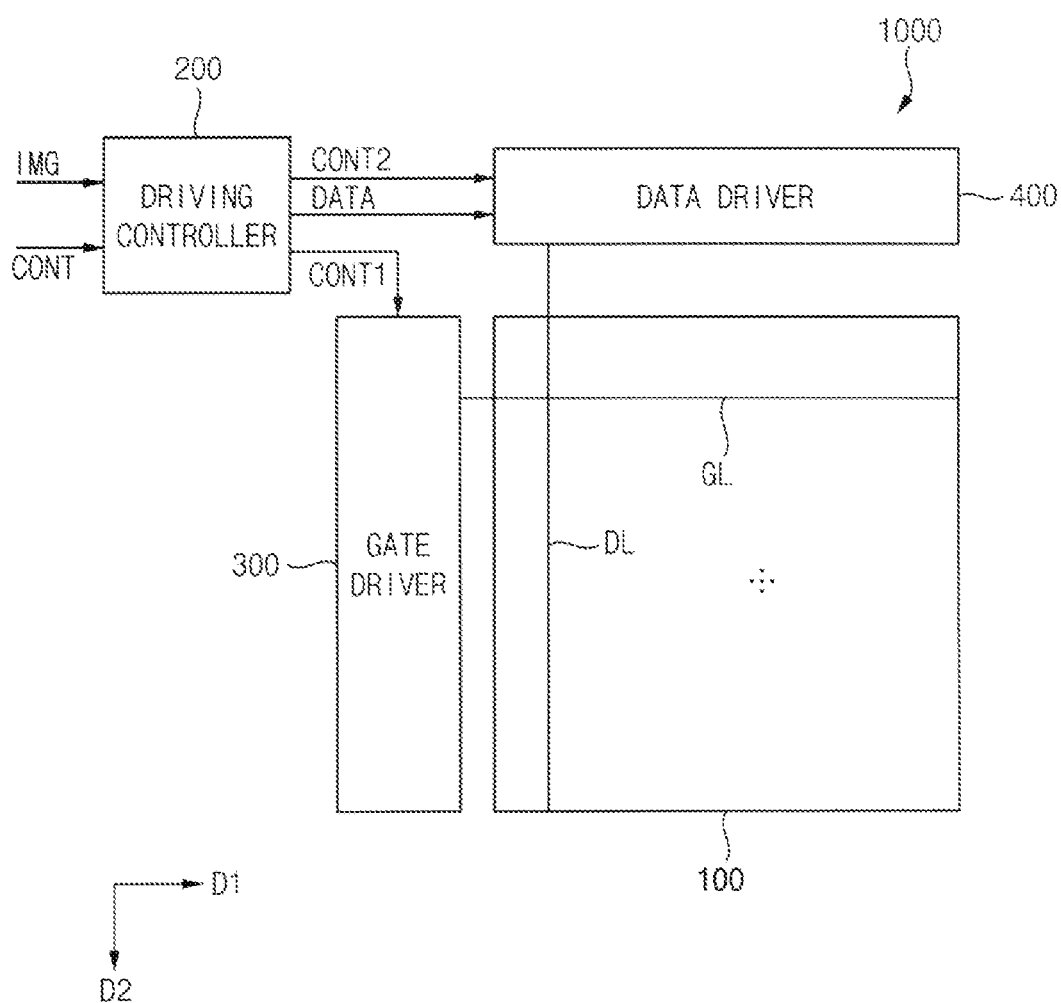
FIG. 3 is a block diagram of the flexible display device of FIG. 1.
Figure 4A:
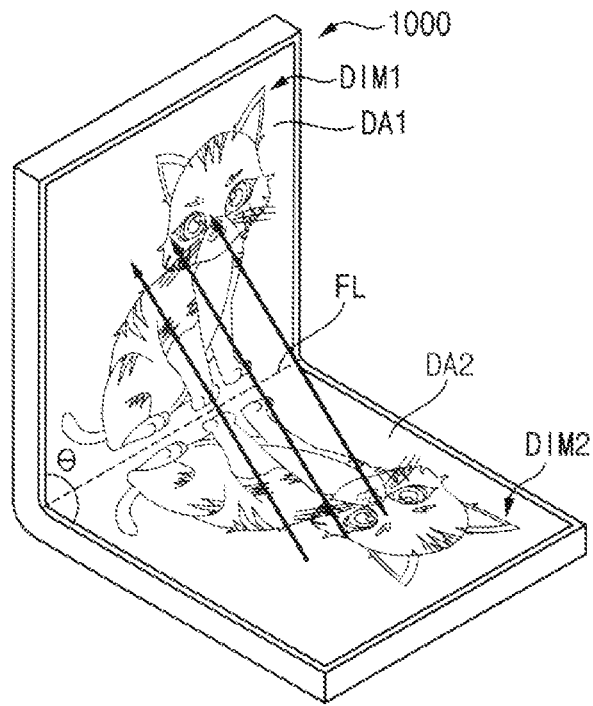
FIG. 4A is a diagram illustrating an operation in which a second image compensates for a first image.
Figure 4B:
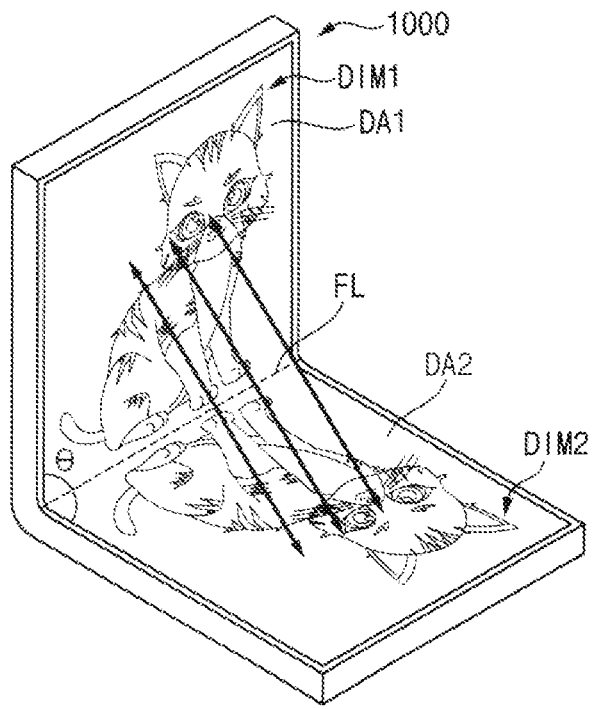
FIG. 4B is a diagram illustrating an operation in which a first image and a second image compensate for each other.

FIG. 3 is a block diagram showing a flexible display device 1000 according to embodiments, FIG. 4A is a diagram showing an operation in which a second image compensates for a first image DIM1, and FIG. 4B is a diagram showing an operation in which a first image DIM1 and a second image DIM2 compensate for each other.

Referring to FIGS. 1, 2, and 3, the flexible display device 1000 may include a flexible display panel 100 and a display panel driver. The display panel driver may include a driving controller 200, a gate driver 300, and a data driver 400.

The flexible display panel 100 may include a display part for displaying an image, and a peripheral part that is adjacent to the display part.

The flexible display panel 100 may include a plurality of gate lines GL, a plurality of data lines DL, and a plurality of pixels electrically connected to the gate lines GL and the data lines DL, respectively. The gate lines GL may extend in a first direction D1, and the data lines DL may extend in a second direction D2 intersecting the first direction D1.

In an embodiment, the flexible display panel 100 may include a first display area DA1 that is adjacent to a first end of the flexible display panel 100, and a second display area DA2 that is adjacent to a second end of the flexible display panel 100. The first display area DA1 and the second display area DA2 may be connected to each other. The first display area DA1 and the second display area DA2 may be divided based on the folding line FL at which the flexible display panel 100 is folded.

The driving controller 200 may receive input image data IMG and an input control signal CONT from an external device. For example, the input image data IMG may include red image data R, green image data G, and blue image data B. The input control signal CONT may include a master clock signal and a data enable signal. The input control signal CONT may further include a vertical synchronization signal and a horizontal synchronization signal.

The driving controller 200 may generate a first control signal CONT1 and a second control signal CONT2 based on the input image data IMG and the input control signal CONT.

The driving controller 200 may generate the first control signal CONT1 for controlling an operation of the gate driver 300 based on the input control signal CONT to output the first control signal CONT1 to the gate driver 300. The first control signal CONT1 may include a vertical start signal and a gate clock signal.

The driving controller 200 may generate the second control signal CONT2 for controlling an operation of the data driver 400 based on the input control signal CONT to output the second control signal CONT2 to the data driver 400. The second control signal CONT2 may include a horizontal start signal and a load signal.

The driving controller 200 may generate a data signal DATA based on the input image data IMG. The driving controller 200 may output the data signal DATA to the data driver 400.

The gate driver 300 may generate gate signals for driving the gate lines GL in response to the first control signal CONT1 received from the driving controller 200. The gate driver 300 may output the gate signals to the gate lines GL.

The data driver 400 may receive the second control signal CONT2 and the data signal DATA from the driving controller 200. The data driver 400 may convert the data signal DATA into an analog data voltage. The data driver 400 may output the data voltage to the data line DL.

Referring to FIG. 4A, the second image DIM2 displayed in the second display area DA2 may compensate for the first image DIM1 displayed in the first display area DA1. For example, in the second mode, the second image displayed in the second display area DA2 may compensate for a luminance and a color difference of the first image DIM1 displayed in the first display area DA1. For example, the second image DIM2 may be a compensation image for the first image DIM1.

The second image DIM2 displayed in the second display area DA2 may be the compensation image for the first image DIM1 that have one-to-one correspondence with the first image DIM1 displayed in the first display area DA1 in a unit of a pixel. Since the first and second images DIM1 and DIM2 that are symmetrical to each other with respect to the folding line FL are displayed in the first display area DA1 and the second display area DA2 in the second mode, respectively, the second image DIM2 may have one-to-one correspondence with the first image DIM1 displayed in the first display area DA1 in a unit of a pixel. The flexible display panel 100 may display the compensation image in the second display area DA2 when a folding angle θ between the first display area DA1 and the second display area DA2 is less than 90 degrees. When the folding angle θ between the first display area DA1 and the second display area DA2 is less than 90 degrees, the second image DIM2 may effectively compensate for the luminance and the color difference of the first image DIM1 as compared with a case where the folding angle θ is greater than 90 degrees.

Referring to FIG. 4B, the first image DIM1 displayed in the first display area DA1 may compensate for the second image DIM2 displayed in the second display area DA2. In detail, the first image DIM1 may compensate for a luminance and a color difference of the second image DIM2, and the second image DIM2 may compensate for the luminance and the color difference of the first image DIM1. For example, the first image DIM1 and the second image DIM2 may compensate for each other in terms of a luminance and a color difference.

As described above, when the second image DIM2 displayed in the second display area DA2 compensates for the luminance and the color difference of the first image DIM1 displayed in the first display area DA1, visibility of the first image DIM1 displayed in the first display area DA1 may be improved in an outdoor environment where external light is strong. As a result, according to the flexible display device 1000 and a method of driving a flexible display device 1000, display quality may be improved.

In order to display the second image DIM2 in the second display area DA2 that compensates for the first image DIM1, the flexible display device 1000 may convert input RGB data RGB_IN included in the input image data IMG into input YCbCr data YCC_IN, may compensate for a luminance and a color difference of the input YCbCr data YCC_IN to generate output YCbCr data YCC_OUT for displaying the second image DIM2 in the second display area DA2 that compensates for the first image DIM1, and may convert the output YCbCr data YCC_OUT into a data signal including output RGB data RGB_OUT. The above configuration will be described in detail with reference to FIGS. 5 to 14.

Figure 5:
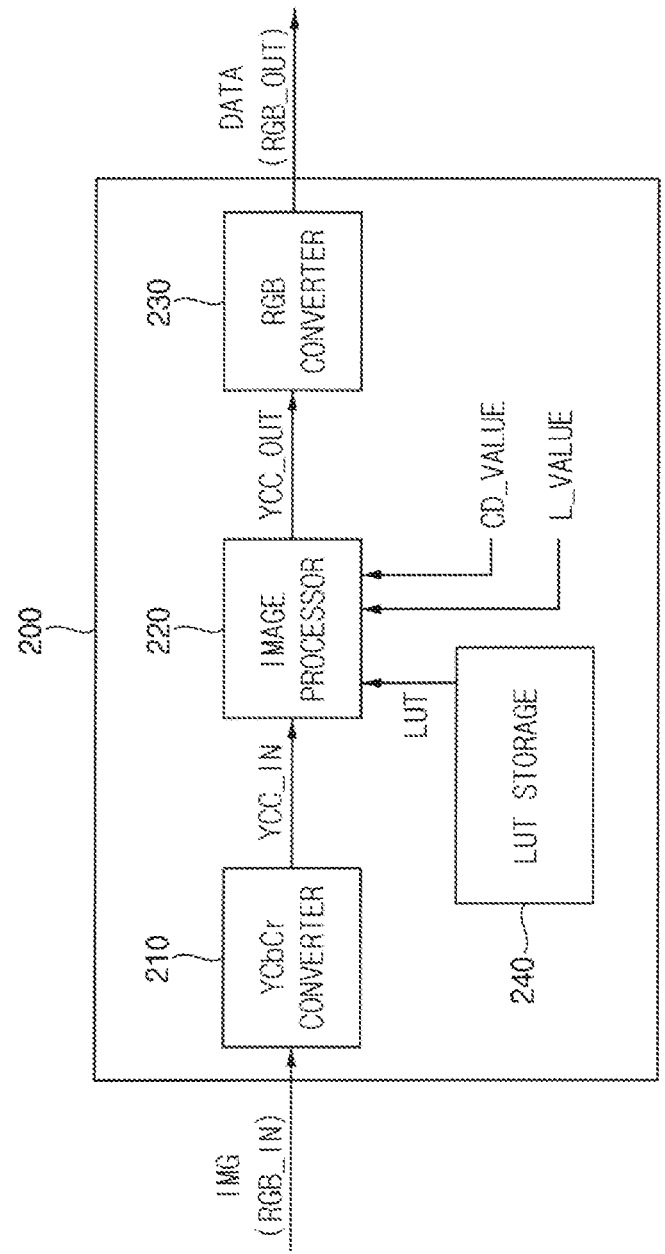
FIG. 5 is a block diagram of a driving controller included in the flexible display device of FIG. 3.

FIG. 5 is a block diagram showing a driving controller included in the flexible display device 1000 of FIG. 3.

Referring to FIGS. 3 and 5, the driving controller 200 may include a YCbCr converter 210, an image processor 220, and an RGB converter 230. The driving controller 200 may further include an LUT storage 240.

The YCbCr converter 210 may convert the input RGB data RGB_IN included in the input image data IMG into the input YCbCr data YCC_IN. The image processor 220 may receive the input YCbCr data, and compensate for the luminance and the color difference of the input YCbCr data YCC_IN to generate the output YCbCr data YCC_OUT for displaying the second image DIM2 in the second display area DA2 that compensates for the first image DIM1. The RGB converter 230 may convert the output YCbCr data YCC_OUT into the data signal including the output RGB data RGB_OUT.

The YCbCr converter 210 may receive the input image data IMG, and convert 10-bit input RGB data RGB_IN included in the input image data IMG into 15-bit input YCbCr data YCC_IN. For example, the input YCbCr data YCC_IN may include input luminance data, input Cb color difference data, and input Cr color difference data. The YCbCr converter 210 may output the input YCbCr data YCC_IN to the image processor 220.

The image processor 220 may receive the input YCbCr data YCC_IN from the YCbCr converter 210. The image processor 220 may receive a look-up table LUT from the LUT storage 240. The image processor 220 may receive a luminance setting value L_VALUE and a color difference setting value CD_VALUE. The image processor 220 may compensate for the luminance and the color difference of the input YCbCr data YCC_IN based on the input YCbCr data YCC_IN, the look-up table LUT, the luminance setting value L_VALUE, and the color difference setting value CD_VALUE to generate the output YCbCr data YCC_OUT. The second image DIM2 displayed in the second display area DA2 may compensate for the first image DIM1 by the output YCbCr data YCC_OUT.

The RGB converter 230 may receive the output YCbCr data YCC_OUT, and convert 15-bit output YCbCr data YCC_OUT into a data signal including 10-bit output RGB data RGB_OUT. The RGB converter 230 may output the data signal to the data driver.

Figure 6:
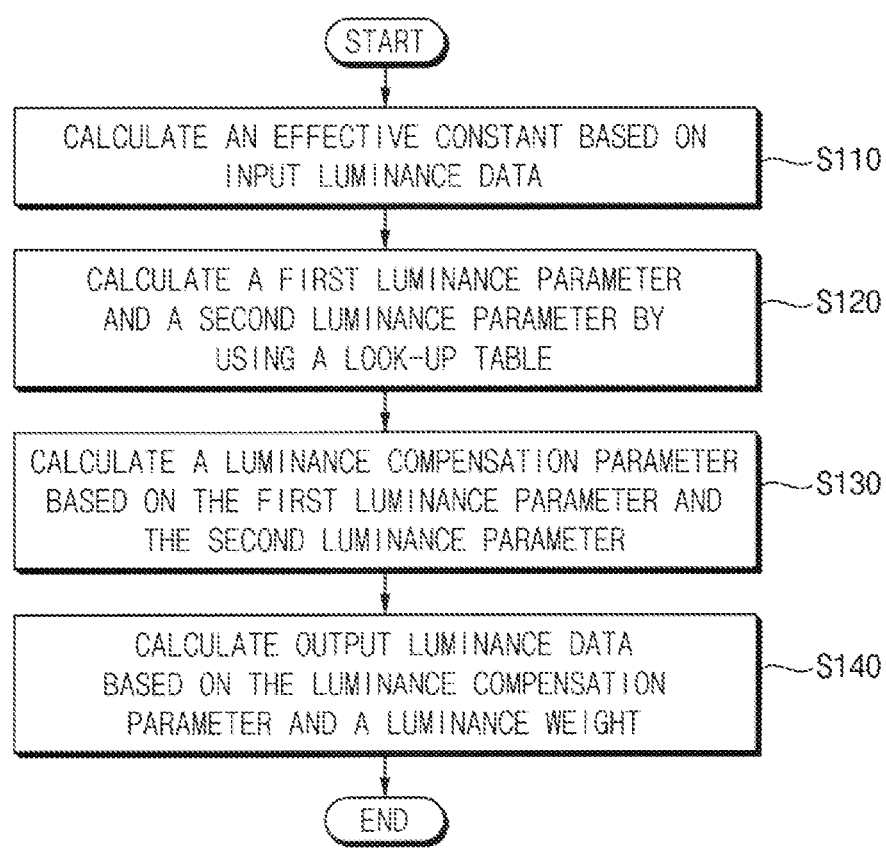
FIG. 6 is a flowchart illustrating an operation in which an image processor included in the driving controller of FIG. 5 calculates output luminance data.

FIG. 6 is a flowchart showing an operation in which the image processor 220 included in the driving controller 200 of FIG. 5 calculates output luminance data, and FIG. 7 is a list of mathematical formulas used when the image processor 220 included in the driving controller 200 of FIG. 5 calculates output luminance data.

Referring to FIGS. 5, 6, and 7, the image processor 220 may calculate a first effective constant and a second effective constant based on the input luminance data included in the input YCbCr data YCC_IN (S110), may calculate a first luminance parameter and a second luminance parameter by using a look-up table for defining a relation between the first effective constant and the first luminance parameter and a relation between the first effective constant and the second luminance parameter (S120), may calculate a luminance compensation parameter based on the first luminance parameter and the second luminance parameter (S130), and may calculate output luminance data based on the luminance compensation parameter and a luminance weight (S140).

In an embodiment, the image processor 220 may calculate the first effective constant and the second effective constant based on the input luminance data included in the input YCbCr data YCC_IN (S110). In detail, the image processor 220 may calculate the first effective constant by the following Mathematical Formula 1.

$$q=\text{rounddown}(Y\_IN/32) \qquad \text{<Mathematical Formula 1>}$$

Here, q may be a first effective constant, Y_IN may be input luminance data, and rounddown(Y_IN/32) may be an integer part of a value obtained by dividing input luminance data by 32. The input luminance data Y_IN may be 15 bits.

The image processor 220 may calculate the second effective constant by the following Mathematical Formula 2.

$$r=\text{mod}(Y\_IN,32) \qquad \text{<Mathematical Formula 2>}$$

Here, r may be a second effective constant, and mod(Y_IN,32) may be a remainder of a value obtained by dividing input luminance data by 32.

In an embodiment, the image processor 220 may calculate the first luminance parameter and the second luminance parameter by using the look-up table LUT for defining the relation between the first effective constant and the first luminance parameter and the relation between the first effective constant and the second luminance parameter (S120).

In detail, when the first effective constant is smaller than a reference effective constant cref, the image processor 220 may calculate the first luminance parameter by the following Mathematical Formula 3 and calculate the second luminance parameter by the following Mathematical Formula 4.

$$cf1=\text{LUT}(q)*32 \qquad \text{<Mathematical Formula 3>}$$

$$cf2=\text{LUT}(q+1)*32 \qquad \text{<Mathematical Formula 4>}$$

Here, cf1 may be a first luminance parameter, cf2 may be a second luminance parameter, LUT(q) may be a corresponding value corresponding to a first effective constant defined in a look-up table, and LUT(q+1) may be a corresponding value corresponding to q+1 defined in a look-up table. For example, the reference effective constant cref may be 1023.

Further, when the first effective constant is greater than or equal to the reference effective constant cref, the image processor 220 may calculate the first luminance parameter by the following Mathematical Formula 5 and calculate the second luminance parameter by the following Mathematical Formula 6.

$$cf1=\text{LUT}(q)*32 \qquad \text{<Mathematical Formula 5>}$$

$$cf2=\text{LUT}(q)*32 \qquad \text{<Mathematical Formula 6>}$$

Here, cf1 may be a first luminance parameter, cf2 may be a second luminance parameter, and LUT(q) may be a corresponding value corresponding to a first effective constant defined in a look-up table.

In an embodiment, the image processor 220 may calculate the luminance compensation parameter based on the first luminance parameter and the second luminance parameter (S130).

In detail, in an embodiment, when the first luminance parameter is less than or equal to a second luminance parameter, the image processor 220 may calculate the luminance compensation parameter by the following Mathematical Formula 7.

$$cf=\text{rounddown}((cf2-cf1)*r/32)+cf1 \qquad \text{<Mathematical Formula 7>}$$

Here, cf may be a luminance compensation parameter, cf1 may be a first luminance parameter, cf2 may be a second luminance parameter, r may be a second effective constant, and rounddown((cf2−cf1)*r/32) may be an integer part of (cf2−cf1)*r/32.

Further, when the first luminance parameter is greater than the second luminance parameter, the image processor 220 may calculate the luminance compensation parameter by the following Mathematical Formula 8.

$$cf=cf1-\text{rounddown}((cf1-cf2)*r/32) \qquad \text{<Mathematical Formula 8>}$$

Here, cf may be a luminance compensation parameter, cf1 may be a first luminance parameter, cf2 may be a second luminance parameter, r may be a second effective constant, and rounddown((cf1−cf2)*r/32) may be an integer part of (cf1−cf2)*r/32.

In an embodiment, the image processor 220 may calculate the output luminance data based on the luminance compensation parameter and the luminance weight (S140). In detail, the image processor 220 may calculate the output luminance data by the following Mathematical Formula 9.

$$Y\_OUT=Y\_IN+cf*LW \qquad \text{<Mathematical Formula 9>}$$

Here, Y_OUT may be output luminance data, Y_IN may be input luminance data, cf may be a luminance compensation parameter, and LW may be a luminance weight. The output luminance data Y_OUT may be 15 bits.

FIG. 8 is a flowchart showing an operation in which the image processor 220 included in the driving controller 200 of FIG. 5 calculates output Cb color difference data, FIG. 9 is a list of mathematical formulas used when an image processor included in the driving controller of FIG. 5 calculates a color difference adjustment value and a threshold color difference adjustment weight, FIG. 10 is a list of mathematical formulas used when an image processor included in the driving controller of FIG. 5 calculates a Cb color difference compensation parameter, and FIG. 11 is a list of mathematical formulas used when an image processor included in the driving controller of FIG. 5 calculates output Cb color difference data.

Referring to FIGS. 5, 8, 9, 10, and 11, the image processor 220 may calculate a color difference adjustment value and a threshold color difference adjustment weight based on the color difference setting value CD_VALUE (S200), may calculate a Cb color difference compensation parameter based on input Cb color difference data, the color difference adjustment value, and an input threshold color difference weight (S310), and may calculate output Cb color difference data based on effective Cb color difference data and the Cb color difference compensation parameter (S320).

In an embodiment, the image processor 220 may calculate the color difference adjustment value and the threshold color difference adjustment weight based on the color difference setting value CD_VALUE (S200). In detail, the image processor 220 may receive the color difference setting value CD_VALUE, and calculate the color difference adjustment value and the threshold color difference adjustment weight based on the color difference setting value CD_VALUE. The color difference setting value CD_VALUE may include at least one of color difference control values, an input color difference weight, reference color difference weights, and input threshold color difference adjustment weights.

The image processor 220 may calculate the color difference adjustment value by the following Mathematical Formula 10, and calculate the threshold color difference adjustment weight by the following Mathematical Formula 11 when the input color difference weight is less than or equal to a first reference color difference weight.

$$\text{Interpolation\_point}=(\text{reg\_color\_ctrl1}-\text{reg\_color\_ctrl0}) \\ *\text{reg\_color\_weight}/64+\text{reg\_color\_ctrl0} \quad \text{<Mathematical Formula 10>}$$

$$\text{color\_weight\_th}\_i=\text{reg\_color\_weight\_th}\_i1 \quad \text{<Mathematical Formula 11>}$$

Here, Interpolation_point may be a color difference adjustment value, reg_color_ctrl0 may be an initial color difference control value, reg_color_ctrl1 may be a first color difference control value, reg_color_weight may be an input color difference weight, color_weight_th_i may be a threshold color difference adjustment weight, and reg_color_weight_th_i1 may be a first input threshold color difference adjustment weight.

Further, the image processor 220 may calculate the color difference adjustment value by the following Mathematical Formula 12 and calculate the threshold color difference adjustment weight by the following Mathematical Formula 13 when the input color difference weight is greater than the first reference color difference weight, and less than or equal to a second reference color difference weight.

$$\text{Interpolation\_point}=(\text{reg\_color\_ctrl2}-\text{reg\_color\_ctrl1}) \\ *(\text{reg\_color\_weight}-w1)/64+\text{reg\_color\_ctrl1} \quad \text{<Mathematical Formula 12>}$$

$$\text{color\_weight\_th}\_i=\text{reg\_color\_weight\_th}\_i2 \quad \text{<Mathematical Formula 13>}$$

Here, Interpolation_point may be a color difference adjustment value, reg_color_ctrl1 may be a first color difference control value, reg_color_ctrl2 may be a second color difference control value, reg_color_weight may be an input color difference weight, color_weight_th_i may be a threshold color difference adjustment weight, and reg_color_weight_th_i2 may be a second input threshold color difference adjustment weight.

Further, the image processor 220 may calculate the color difference adjustment value by the following Mathematical Formula 14 and calculate the threshold color difference adjustment weight by the following Mathematical Formula 15 when the input color difference weight is greater than the second reference color difference weight, and less than or equal to a third reference color difference weight.

$$\text{Interpolation\_point}=(\text{reg\_color\_ctrl3}-\text{reg\_color\_ctrl2}) \\ *(\text{reg\_color\_weight}-w2)/64+\text{reg\_color\_ctrl2} \quad \text{<Mathematical Formula 14>}$$

$$\text{color\_weight\_th}\_i=\text{reg\_color\_weight\_th}\_i3 \quad \text{<Mathematical Formula 15>}$$

Here, Interpolation_point may be a color difference adjustment value, reg_color_ctrl2 may be a second color difference control value, reg_color_ctrl3 may be a third color difference control value, reg_color_weight may be an input color difference weight, color_weight_th_i may be a threshold color difference adjustment weight, and reg_color_weight_th_i3 may be a third input threshold color difference adjustment weight.

Further, the image processor 220 may calculate the color difference adjustment value by the following Mathematical Formula 16 and calculate the threshold color difference adjustment weight by the following Mathematical Formula 17 when the input color difference weight is greater than the third reference color difference weight, and less than or equal to a fourth reference color difference weight.

$$\text{Interpolation\_point}=(\text{reg\_color\_ctrl4}-\text{reg\_color\_ctrl3}) \\ *(\text{reg\_color\_weight}-w3)/64+\text{reg\_color\_ctrl3} \quad \text{<Mathematical Formula 16>}$$

$$\text{color\_weight\_th}\_i=\text{reg\_color\_weight\_th}\_i4 \quad \text{<Mathematical Formula 17>}$$

Here, Interpolation_point may be a color difference adjustment value, reg_color_ctrl3 may be a third color difference control value, reg_color_ctrl4 may be a fourth color difference control value, reg_color_weight may be an input color difference weight, color_weight_th_i may be a threshold color difference adjustment weight, and reg_color_weight_th_i4 may be a fourth input threshold color difference adjustment weight.

In an embodiment, the image processor 220 may calculate the Cb color difference compensation parameter based on the input Cb color difference data, the color difference adjustment value, and the input threshold color difference weight (S310). In detail, the image processor 220 may calculate the Cb color difference compensation parameter based on the input Cb color difference data included in the input YCbCr data YCC_IN, the color difference adjustment value, and the input threshold color difference weight included in the color difference setting value CD_VALUE, and calculate the effective Cb color difference data by the following Mathematical Formula 18.

$$Cb\_V=Cb\_\text{IN}-MP \quad \text{<Mathematical Formula 18>}$$

Here, Cb_V may be effective Cb color difference data, Cb_IN may be input Cb color difference data, and MP may be color difference middle data. The input Cb color difference data Cb_IN may be 15 bits. For example, MP may have a value of 16384. The image processor 220 may perform bit-conversion on the input threshold color difference weight to calculate a threshold color difference weight.

The image processor 220 may calculate the Cb color difference compensation parameter by the following Mathematical Formula 19 when an absolute value of the effective Cb color difference data is greater than the threshold color difference weight.

$$cb\_\text{interpolation\_point}=2\infty+\text{interpolation\_point}*2^{20}- \\ \text{interpolation\_point}*(\text{abs}(Cb\_V)- \\ \text{color\_weight\_th})*\text{color\_weight\_th}\_i \quad \text{<Mathematical Formula 19>}$$

Here, cb_interpolation_point may be a Cb color difference compensation parameter, interpolation_point may be a color difference adjustment value, abs(Cb_V) may be an absolute value of effective Cb color difference data, color_weight_th may be a threshold color difference weight, and color_weight_th_i may be a threshold color difference adjustment weight.

Further, the image processor 220 may calculate the Cb color difference compensation parameter by the following Mathematical Formula 20 when the absolute value of the effective Cb color difference data is less than or equal to the threshold color difference weight.

$$cb\_\text{interpolation\_point}=2^{28}+ \\ \text{interpolation\_point}*2^{20} \quad \text{<Mathematical Formula 20>}$$

Here, cb_interpolation_point may be a Cb color difference compensation parameter, and interpolation_point may be a color difference adjustment value.

In an embodiment, the image processor 220 may calculate the output Cb color difference data based on the effective Cb color difference data and the Cb color difference compensation parameter (S320).

The image processor 220 may calculate middle Cb color difference data by the following Mathematical Formula 21.

$$Cb\_MIDDLE = Cb\_V * (cb\_interpolation\_point)/2\infty \quad \text{<Mathematical Formula 21>}$$

Here, Cb_MIDDLE may be middle Cb color difference data, Cb_V may be effective Cb color difference data, and cb_interpolation_point may be a Cb color difference compensation parameter.

The image processor 220 may calculate the output Cb color difference data by the following Mathematical Formula 22.

$$Cb\_OUT = Cb\_MIDDLE + MP \quad \text{<Mathematical Formula 22>}$$

Here, Cb_OUT may be output Cb color difference data, Cb_MIDDLE may be middle Cb color difference data, and MP may be color difference middle data. The output Cb color difference data Cb_OUT may be 15 bits.

Figure 12:
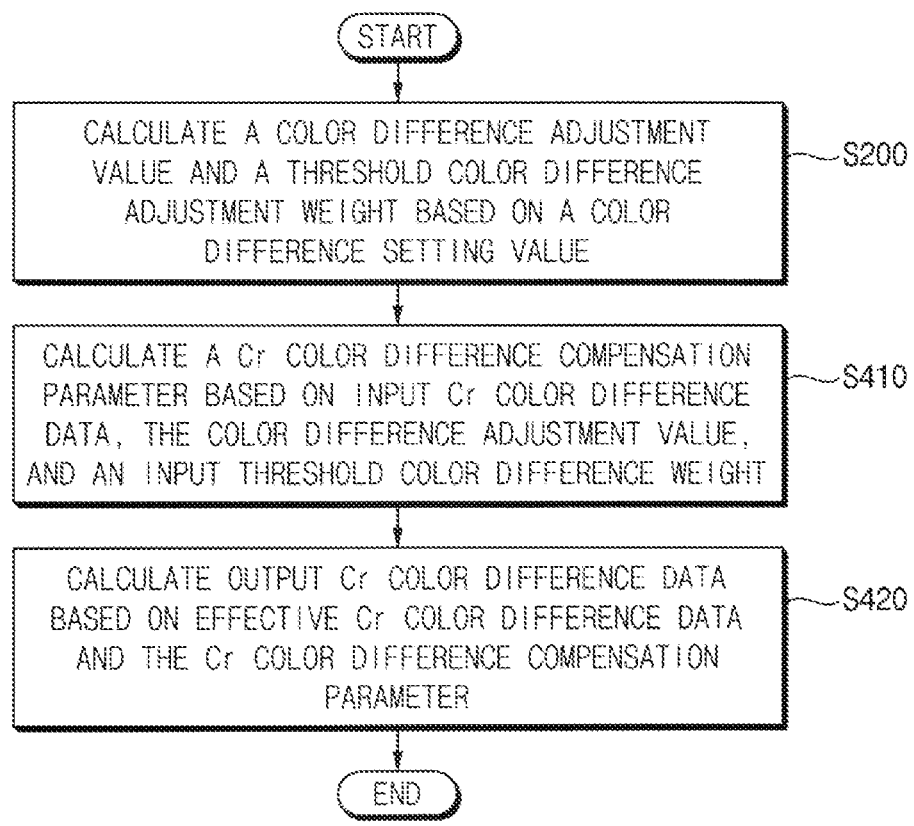
FIG. 12 is a flowchart showing an operation in which an image processor included in the driving controller of FIG. 5 calculates output Cr color difference data.

FIG. 12 is a flowchart showing an operation in which the image processor 220 included in the driving controller 200 of FIG. 5 calculates output Cr color difference data, FIG. 13 is a list of mathematical formulas used when an image processor included in the driving controller of FIG. 5 calculates a Cr color difference compensation parameter, and FIG. 14 is a list of mathematical formulas used when an image processor included in the driving controller of FIG. 5 calculates output Cr color difference data.

Referring to FIGS. 5, 9, and 12, 13, and 14, the image processor 220 may calculate a color difference adjustment value and a threshold color difference adjustment weight based on the color difference setting value CD_VALUE (S200), may calculate a Cr color difference compensation parameter based on input Cr color difference data, the color difference adjustment value, and an input threshold color difference weight (S410), and may calculate output Cr color difference data based on effective Cr color difference data and the Cr color difference compensation parameter (S420).

In an embodiment, the image processor 220 may calculate the color difference adjustment value and the threshold color difference adjustment weight based on the color difference setting value CD_VALUE (S200). In detail, the image processor 220 may receive the color difference setting value CD_VALUE, and calculate the color difference adjustment value and the threshold color difference adjustment weight based on the color difference setting value CD_VALUE. The color difference setting value CD_VALUE may include at least one of color difference control values, an input color difference weight, reference color difference weights, and input threshold color difference adjustment weights.

In an embodiment, the image processor 220 may calculate the Cr color difference compensation parameter based on the input Cr color difference data, the color difference adjustment value, and the input threshold color difference weight (S410). In detail, the image processor 220 may calculate the Cr color difference compensation parameter based on the input Cr color difference data included in the input YCbCr data YCC_IN, the color difference adjustment value, and the input threshold color difference weight included in the color difference setting value CD_VALUE, and calculate the effective Cr color difference data by the following Mathematical Formula 23.

$$Cr\_V = Cr\_IN - MP \quad \text{<Mathematical Formula 23>}$$

Here, Cr_V may be effective Cr color difference data, Cr_IN may be input Cr color difference data, and MP may be color difference middle data. The input Cr color difference data Cr_IN may be 15 bits. For example, MP may have a value of 16384. The image processor 220 may perform bit-conversion on the input threshold color difference weight to calculate a threshold color difference weight.

The image processor 220 may calculate the Cr color difference compensation parameter by the following Mathematical Formula 24 when an absolute value of the effective Cr color difference data is greater than the threshold color difference weight.

$$cr\_interpolation\_point = 2\infty + interpolation\_point * 2^{20} - interpolation\_point * (abs(Cr\_V) - color\_weight\_th) * color\_weight\_th\_i \quad \text{<Mathematical Formula 24>}$$

Here, cr_interpolation_point may be a Cr color difference compensation parameter, interpolation_point may be a color difference adjustment value, abs(Cr_V) may be an absolute value of effective Cr color difference data, color_weight_th may be a threshold color difference weight, and color_weight_th_i may be a threshold color difference adjustment weight.

The image processor 220 may calculate the Cr color difference compensation parameter by the following Mathematical Formula 25 when the absolute value of the effective Cr color difference data is less than or equal to the threshold color difference weight.

$$cr\_interpolation\_point = 2^{28} + interpolation\_point * 2^{20} \quad \text{<Mathematical Formula 25>}$$

Here, cr_interpolation_point may be a Cr color difference compensation parameter, and interpolation_point may be a color difference adjustment value.

In an embodiment, the image processor 220 may calculate the output Cr color difference data based on the effective Cr color difference data and the Cr color difference compensation parameter (S420).

The image processor 220 may calculate middle Cr color difference data by the following Mathematical Formula 26.

$$Cr\_MIDDLE = Cr\_V * (cr\_interpolation\_point)/2\infty \quad \text{<Mathematical Formula 26>}$$

Here, Cr_MIDDLE may be middle Cr color difference data, Cr_V may be effective Cr color difference data, and cr_interpolation_point may be a Cr color difference compensation parameter.

The image processor 220 may calculate the output Cr color difference data by the following Mathematical Formula 27.

$$Cr\_OUT = Cr\_MIDDLE + MP \quad \text{<Mathematical Formula 27>}$$

Here, Cr_OUT may be output Cr color difference data, Cr_MIDDLE may be middle Cr color difference data, and MP may be color difference middle data. The output Cr color difference data Cr_OUT may be 15 bits.

As described above, the image processor 220 may compensate for the luminance and the color difference of the input YCbCr data YCC_IN to generate the output YCbCr data YCC_OUT. The second image DIM2 displayed in the second display area DA2 may compensate for the first image DIM1 by the output YCbCr data YCC_OUT.

When the second image DIM2 displayed in the second display area DA2 compensates for the luminance and the color difference of the first image DIM1 displayed in the first display area DA1, the visibility of the first image DIM1 displayed in the first display area DA1 may be improved in the outdoor environment where the external light is strong. As a result, according to the flexible display device 1000 and the method of driving the flexible display device 1000, the display quality may be improved.

In brief, embodiments may reduce power consumption of a display device (e.g., the flexible display device 1000).

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A flexible display device comprising:
    a flexible display panel having a first display area that is adjacent to a first end of the flexible display panel and a second display area that is adjacent to a second end of the flexible display panel;
    a data driver configured to output a data voltage to the flexible display panel; and
    a driving controller configured to control the data driver, the driving controller including a YCbCr converter configured to convert input RGB data included in input image data into input YCbCr data, and an image processor 220 configured to receive the input YCbCr data and to compensate for a luminance and a color difference of the input YCbCr data to generate output YCbCr data for displaying the second image in the second display area that compensates for the first image;
    wherein a second image displayed in the second display area is a compensation image that compensates for a luminance and a color difference of the first image displayed in the first display area, and
    wherein the image processor is further configured to:
    calculate a first effective constant and a second effective constant based on input luminance data included in the input YCbCr data;
    calculate a first luminance parameter and a second luminance parameter by using a look-up table for defining a relation between the first effective constant and the first luminance parameter and a relation between the first effective constant and the second luminance parameter;
    calculate a luminance compensation parameter based on the first luminance parameter and the second luminance parameter; and
    calculate output luminance data based on the luminance compensation parameter and a luminance weight.

2. The flexible display device of claim 1, wherein the first image displayed in the first display area compensates for the second image displayed in the second display area.

3. The flexible display device of claim 1, wherein, in a first mode, the first image displayed in the first display area and the second image displayed in the second display area form one continuous image,
    wherein, in a second mode, the first image displayed in the first display area and the second image displayed in the second display area are substantially symmetrical to each other with respect to a folding line of the flexible display panel, and
    wherein, in the second mode, the second image displayed in the second display area is the compensation image that compensates for the luminance and the color difference of the first image displayed in the first display area.

4. The flexible display device of claim 3, wherein the second image displayed in the second display area is the compensation image having one-to-one correspondence with the first image displayed in the first display area in a unit of a pixel.

5. The flexible display device of claim 3, wherein the flexible display panel is configured to display the compensation image in the second display area when a folding angle between the first display area and the second display area is less than 90 degrees.

6. The flexible display device of claim 1, wherein the driving controller further comprises:
    an RGB converter configured to convert the output YCbCr data into a data signal including output RGB data.

7. The flexible display device of claim 1, wherein the image processor is configured to:
    calculate the first effective constant by using a mathematical formula "q=rounddown(Y_IN/32)", wherein q is the first effective constant, Y_IN is the input luminance data, and rounddown(Y_IN/32) is an integer part of a value obtained by dividing the input luminance data by 32; and
    calculate the second effective constant by using a mathematical formula "r=mod(Y_IN,32)", wherein r is the second effective constant, and mod(Y_IN,32) is a remainder of a value obtained by dividing the input luminance data by 32.

8. The flexible display device of claim 1, wherein the image processor is configured to: calculate the first luminance parameter by using a mathematical formula "cf1=LUT(q)*32" and calculate the second luminance parameter by using a mathematical formula "cf2=LUT(q+1)*32" when the first effective constant is less than a reference effective constant, wherein cf1 is the first luminance parameter, cf2 is the second luminance parameter, LUT(q) is a corresponding value corresponding to the first effective constant defined in the look-up table, and LUT(q+1) is a corresponding value corresponding to qt+1 defined in the look-up table; and calculate the first luminance parameter by using a mathematical formula "cf1=LUT(q)*32" and calculate the second luminance parameter by using a mathematical formula "cf2=LUT(q) *32" when the first effective constant is greater than or equal to the reference effective constant, wherein cf1 is the first luminance parameter, cf2 is the second luminance parameter, and LUT(q) is a corresponding value corresponding to the first effective constant defined in the look-up table.

9. The flexible display device of claim 1, wherein the image processor is configured to:
    calculate the luminance compensation parameter by using a mathematical formula "cf=rounddown((cf2−cf1)*r/32)+cf1" when the first luminance parameter is less than or equal to the second luminance parameter, wherein cf is the luminance compensation parameter, cf1 is the first luminance parameter, cf2 is the second luminance parameter, r is the second effective constant, and rounddown((cf2−cf1)*r/32) is an integer part of (cf2−cf1)*r/32; and
    calculate the luminance compensation parameter by using a mathematical formula "cf=cf1−rounddown((cf1−cf2)*r/32)" when the first luminance parameter is greater than the second luminance parameter, wherein cf is the luminance compensation parameter, cf1 is the first luminance parameter, cf2 is the second luminance parameter, r is the second effective constant, and rounddown((cf1−cf2)*r/32) is an integer part of (cf1−cf2)*r/32.

10. The flexible display device of claim 1, wherein the image processor is configured to calculate the output luminance data by using a mathematical formula "Y_OUT=Y_IN+cf*LW", wherein Y_OUT is the output luminance data, Y_IN is the input luminance data, cf is the luminance compensation parameter, and LW is the luminance weight.

11. The flexible display device of claim 6, wherein the image processor is configured to receive a color difference setting value and to calculate a color difference adjustment value and a threshold color difference adjustment weight based on the color difference setting value, wherein the color difference setting value includes at least one of color difference control values, an input color difference weight, reference color difference weights, and input threshold color difference adjustment weights, and wherein the image processor is configured to:

calculate the color difference adjustment value by using a mathematical formula "Interpolation_point=(reg_color_ctrl1-reg_color_ctrl0)*reg_color_weight/64+reg_color_ctrl0" and calculate the threshold color difference adjustment weight by using a mathematical formula "color_weight_th_i=reg_color_weight_th_i1" when the input color difference weight is less than or equal to a first reference color difference weight, wherein Interpolation_point is the color difference adjustment value, reg_color_ctrl0 is an initial color difference control value, reg_color_ctrl1 is a first color difference control value, reg_color_weight is an input color difference weight, color_weight_th_i is the threshold color difference adjustment weight, and reg_color_weight_th_i1 is a first input threshold color difference adjustment weight;

calculate the color difference adjustment value by using a mathematical formula "Interpolation_point=(reg_color_ctrl2-reg_color_ctrl1)*(reg_color_weight-w1)/64+reg_color_ctrl1" and calculate the threshold color difference adjustment weight by using a mathematical formula "color_weight_th_i=reg_color_weight_th_i2" when the input color difference weight is greater than the first reference color difference weight and less than or equal to a second reference color difference weight, wherein Interpolation_point is the color difference adjustment value, reg_color_ctrl1 is the first color difference control value, reg_color_ctrl2 is a second color difference control value, reg_color_weight is the input color difference weight, color_weight_th_i is the threshold color difference adjustment weight, and reg_color_weight_th_i2 is a second input threshold color difference adjustment weight;

calculate the color difference adjustment value by using a mathematical formula "Interpolation_point=(reg_color_ctrl3−reg_color_ctrl2)*(reg_color_weight-w2)/64+reg_color_ctrl2" and calculate the threshold color difference adjustment weight by using a mathematical formula "color_weight_th_i=reg_color_weight_th_i3" when the input color difference weight is greater than the second reference color difference weight and less than or equal to a third reference color difference weight, wherein Interpolation_point is the color difference adjustment value, reg_color_ctrl2 is the second color difference control value, reg_color_ctrl3 is a third color difference control value, reg_color_weight is the input color difference weight, color_weight_th_i is the threshold color difference adjustment weight, and reg_color_weight_th_i3 is a third input threshold color difference adjustment weight; and calculate the color difference adjustment value by using a mathematical formula "Interpolation_point=(reg_color_ctrl4-reg_color_ctrl3)*(reg_color_weight-w3)/64+reg_color_ctrl3" and calculate the threshold color difference adjustment weight by using a mathematical formula "color_weight_th_i=reg_color_weight_th_i4" when the input color difference weight is greater than the third reference color difference weight and less than or equal to a fourth reference color difference weight, wherein Interpolation_point is the color difference adjustment value, reg_color_ctrl3 is the third color difference control value, reg_color_ctrl4 is a fourth color difference control value, reg_color_weight is the input color difference weight, color_weight_th_i is the threshold color difference adjustment weight, and reg_color_weight_th_i4 is a fourth input threshold color difference adjustment weight.

12. The flexible display device of claim 6, wherein the image processor is configured to:

receive a color difference setting value and calculate a color difference adjustment value and a threshold color difference adjustment weight based on the color difference setting value;

calculate a Cb color difference compensation parameter based on input Cb color difference data included in the input YCbCr data, the color difference adjustment value, and an input threshold color difference weight included in the color difference setting value;

calculate effective Cb color difference data by using a mathematical formula "Cb_V=Cb_IN−MP", wherein Cb_V is the effective Cb color difference data, Cb_IN is the input Cb color difference data, and MP is color difference middle data;

perform bit-conversion on the input threshold color difference weight to calculate a threshold color difference weight; and calculate output Cb color difference data based on the effective Cb color difference data and the Cb color difference compensation parameter.

13. The flexible display device of claim 12, wherein the image processor is configured to:

calculate the Cb color difference compensation parameter by using a mathematical formula "cb_interpolation_point=2^28+interpolation_point*2^20-interpolation_point*(abs(Cb_V)−color_weight_th)*color_weight_th_i" when an absolute value of the effective Cb color difference data is greater than the threshold color difference weight, wherein cb_interpolation_point is the Cb color difference compensation parameter, interpolation_point is the color difference adjustment value, abs(Cb_V) is the absolute value of the effective Cb color difference data, color_weight_th is the threshold color difference weight, and color_weight_th_i is the threshold color difference adjustment weight; and calculate the Cb color difference compensation parameter by using a mathematical formula "cbinterpolation_point=2^28+interpolation_point*2^20" when the absolute value of the effective Cb color difference data is less than or equal to the threshold color difference weight, wherein cb_interpolation_point is the Cb color difference compensation parameter, and interpolation_point is the color difference adjustment value.

14. The flexible display device of claim 12, wherein the image processor is configured to:
    calculate middle Cb color difference data by using a mathematical formula "Cb_MIDDLE=Cb_V*(cb_interpolation_point)/2^28", wherein Cb_MIDDLE is the middle Cb color difference data, Cb_V is the effective Cb color difference data, and cb_interpolation_point is the Cb color difference compensation parameter; and
    calculate the output Cb color difference data by using a mathematical formula "Cb_OUT=Cb_MIDDLE+MP", wherein Cb_OUT is the output Cb color difference data, Cb_MIDDLE is the middle Cb color difference data, and MP is the color difference middle data.

15. The flexible display device of claim 6, wherein the image processor is configured to:
    calculate a Cr color difference compensation parameter based on input Cr color difference data included in the input YCbCr data, a color difference adjustment value calculated based on a color difference setting value, and an input threshold color difference weight included in the color difference setting value;
    calculate effective Cr color difference data by using a mathematical formula "Cr_V=Cr_IN−MP", wherein Cr_V is the effective Cr color difference data, Cr_IN is the input Cr color difference data, and MP is color difference middle data;
    perform bit-conversion on the input threshold color difference weight to calculate a threshold color difference weight; and
    calculate output Cr color difference data based on the effective Cr color difference data and the Cr color difference compensation parameter.

16. The flexible display device of claim 15, wherein the image processor is configured to:
    calculate the Cr color difference compensation parameter by using a mathematical formula "cr_interpolation_point=2^28+interpolation_point*2^20-interpolation_point*(abs(Cr_V)−color_weight_th)*color_weight_th_i" when an absolute value of the effective Cr color difference data is greater than the threshold color difference weight, wherein cr_interpolation_point is the Cr color difference compensation parameter, interpolation_point is the color difference adjustment value, abs(Cr_V) is the absolute value of the effective Cr color difference data, color_weight_th is the threshold color difference weight, and color_weight_th_i is the threshold color difference adjustment weight; and
    calculate the Cr color difference compensation parameter by using a mathematical formula "cr_interpolation_point=2^28+interpolation_point*2^20" when the absolute value of the effective Cr color difference data is less than or equal to the threshold color difference weight, wherein cr_interpolation_point is the Cr color difference compensation parameter, and interpolation_point is the color difference adjustment value.

17. The flexible display device of claim 15, wherein the image processor is configured to:
    calculate middle Cr color difference data by using a mathematical formula "Cr_MIDDLE=Cr_V*(cr_interpolation_point)/2^28", wherein Cr_MIDDLE is the middle Cr color difference data, Cr_V is the effective Cr color difference data, and cr_interpolation_point is the Cr color difference compensation parameter; and
    calculate the output Cr color difference data by using a mathematical formula "Cr_OUT=Cr_MIDDLE+MP", wherein CLOUT is the output Cr color difference data, Cr_MIDDLE is the middle Cr color difference data, and MP is the color difference middle data.

18. A method of driving a flexible display device, the method comprising the steps of:
    displaying a first image in a first display area that is adjacent to a first end of a flexible display panel;
    displaying a second image in a second display area that is adjacent to a second end of the flexible display panel,
    converting input RGB data included in input image data into input YCbCr data;
    calculating a first effective constant and a second effective constant based on input luminance data included in the input YCbCr data;
    calculating a first luminance parameter and a second luminance parameter by using a look-up table for defining a relation between the first effective constant and the first luminance parameter and a relation between the first effective constant and the second luminance parameter;
    calculating a luminance compensation parameter based on the first luminance parameter and the second luminance parameter; and
    calculating output luminance data based on the luminance compensation parameter and a luminance weight,
    wherein, in a first mode, the first image displayed in the first display area and the second image displayed in the second display area form one continuous image,
    wherein, in a second mode, the first image displayed in the first display area and the second image displayed in the second display area are substantially symmetrical to each other with respect to a folding line of the flexible display panel, and
    wherein, in the second mode, the second image displayed in the second display area compensates for a luminance and a color difference of the first image displayed in the first display area.

19. The method of claim 18, further comprising the steps of:
    compensating for a luminance and a color difference of the input YCbCr data to generate output YCbCr data for displaying the second image in the second display area that compensates for the luminance and the color difference of the first image; and
    converting the output YCbCr data into a data signal including output RGB data.

* * * * *